March 12, 1935.  G. P. BARTELS  1,994,268
COOKING UTENSIL
Filed Aug. 12, 1933  2 Sheets-Sheet 1
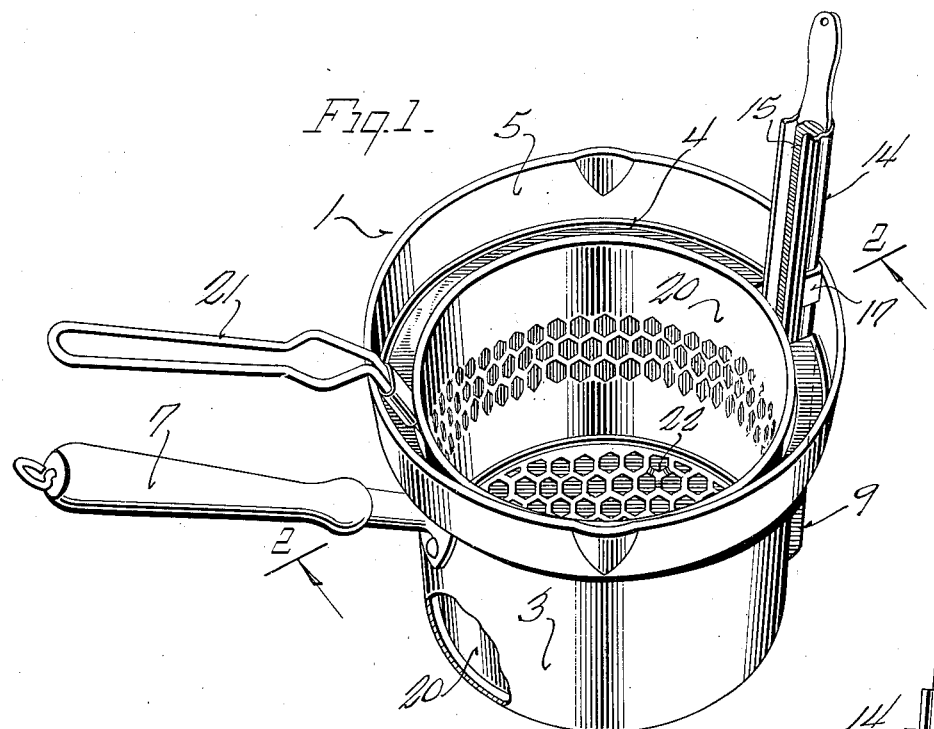
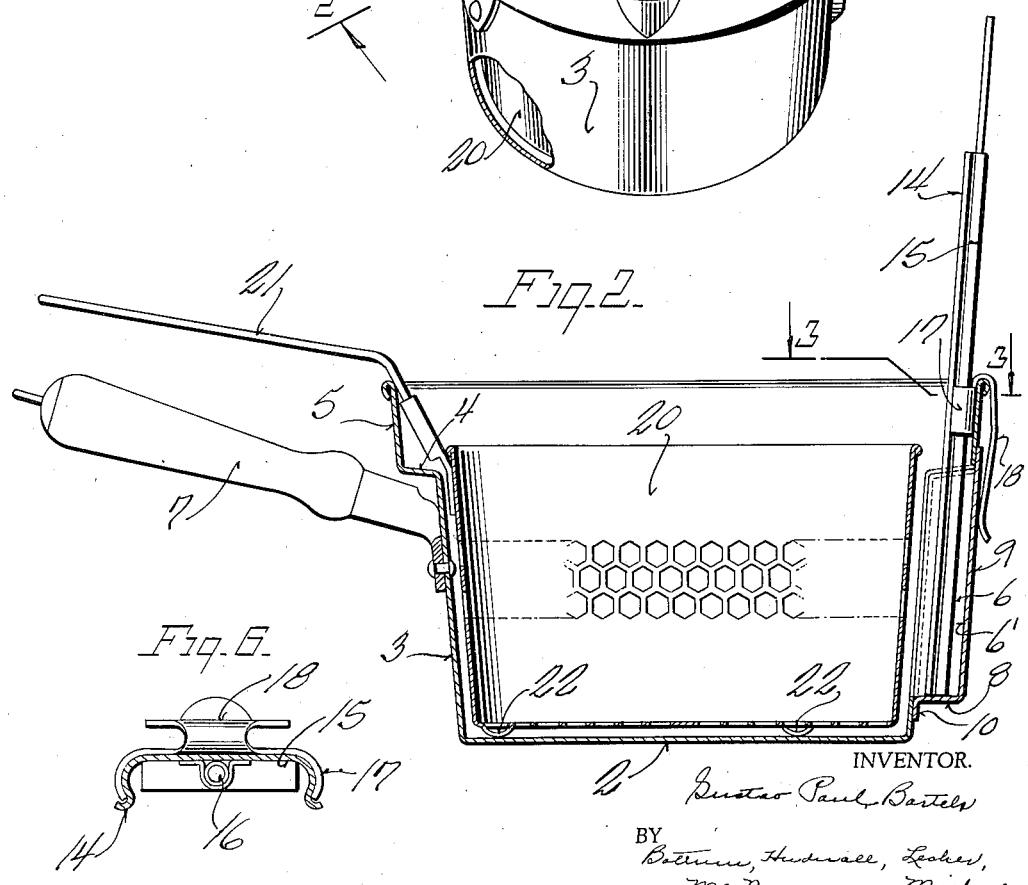
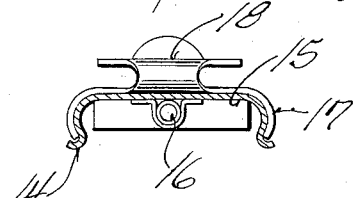
INVENTOR.
Gustav Paul Bartels
BY
ATTORNEYS March 12, 1935.   G. P. BARTELS   1,994,268
COOKING UTENSIL
Filed Aug. 12, 1933   2 Sheets-Sheet 2
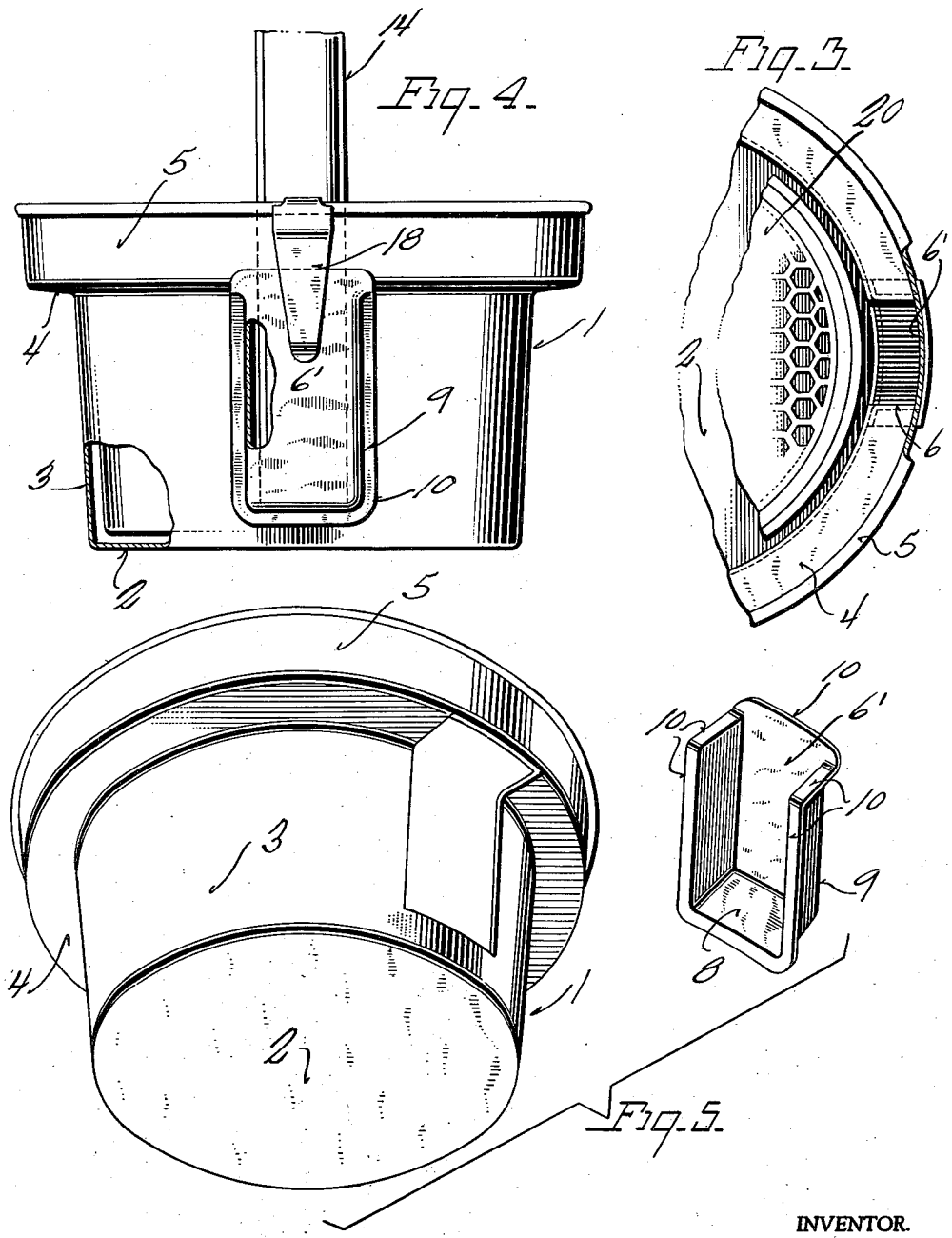
INVENTOR.
Gustav Paul Bartels
BY
Bottum, Hudnall, Lecher,
McNamara & Michael
ATTORNEYS Patented Mar. 12, 1935

1,994,268

UNITED STATES PATENT OFFICE 1,994,268

COOKING UTENSIL

Gustav Paul Bartels, New Orleans, La.

Application August 12, 1933, Serial No. 684,784

9 Claims. (Cl. 53—7)

The present invention relates generally to cooking utensils and more particularly to the type of cooking utensils known as "French" fryers, in which the food forming material is immersed in the hot cooking oil or other hot liquid fat, with which the cooking vessel is supplied in a suitable quantity.

The best results are achieved by maintaining the temperature of the hot cooking oil at a predetermined degree, inasmuch as by this practice the food material which has been placed in the vessel is cooked uniformly, and the whole of the food made more attractive to the palate.

Different food materials are cooked at different temperatures, and it is essential to the attainment of such best results that a proportioned temperature be maintained during the time that a particular variety of food material is being cooked.

My invention resides in an improvement in devices of this class, in which the vessel is specially constructed for the accommodation and support of a thermometer, the bulb of which is submerged and the scale of which is exposed for convenient reading. When the desired temperature is indicated, the food material is plunged into the hot oil or fat and retained therein for the length of time necessary to properly cook the same. It may then be withdrawn, or replaced by another batch, and so on, with the assurance that all of the food formed in one or a succession of batches will be cooked in a uniform condition.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a perspective view showing a cooking utensil embodying the present invention;

Figure 2 is a view in transverse vertical section taken on line 2—2 of Figure 1;

Figure 3 is a fragmentary view taken on line 3—3 of Figure 2 and showing the utensil partly in top plan and partly in horizontal section, the thermometer being removed for the sake of illustration;

Figure 4 is a view in elevation looking toward the portion of the outer vessel provided with the channel, parts being broken away and parts being shown in section for the sake of illustration;

Figure 5 is a group view in perspective showing the outer vessel and its channel forming member prior to assembly; and Figure 6 is a detail view in horizontal section showing the manner in which the sliding clamp is adjustably interconnected with the thermometer.

Referring to the drawings, it will be seen that the cooking utensil embodying the present invention includes an outer vessel designated generally at 1 and made up of a bottom 2 and an outer or side wall 3 which may have a slight taper, that is, it inclines outwardly and upwardly. The upper portion of the side wall 3 is flanged outwardly and upwardly, this flanged formation consisting of a horizontal outwardly extending flange 4 and a substantially vertical upwardly extending flange 5. The flanged formation provides an enlarged space at the top of the vessel to take care of the expansion of the hot liquid in the vessel and to avoid overflow of the same. The side wall 3 is provided with a channel 6 in a portion thereof and preferably in that portion located diametrically opposite to a handle 7 with which the outer vessel is provided. The channel 6 opens inwardly so as to communicate freely with the interior of the outer vessel and it extends from a point near the bottom of the vessel up through the horizontal flange 4. At the lower end of the channel a shelf-like structure 8 is formed. Preferably, the bottom 6' of the channel is coincident with the portion of the vertical flange 5 disposed above the same. This channel 6 may be formed by displacing the metal of the side wall 3 and horizontal flange 4 outwardly but preferably it is formed by cutting away a portion of the side wall 3 and a portion of the horizontal flange 4 and attaching a channel forming member 9 to the side wall 3 and to the horizontal and vertical flanges 4 and 5 by welding, soldering, or the like. In the construction illustrated the channel forming member 9 has marginal flanges 10 which overlap and are welded or otherwise suitably secured to portions of the outer vessel. The channel is adapted to receive a thermometer 14 with the lower end of the flanged metal backing plate 15 of the thermometer resting on the shelf 8 and the back of the plate 15 resting against the bottom 6' of the channel and the portion of the flange 5 located above the channel.

The parallel side flanges or edges of the plate 15, upon which the tube 16 of the thermometer is carried, are grooved for the reception of the inturned ends of a U-shaped sliding clamp 17, having formed upon the back of the latter a hook or spring-finger 18. The latter is adapted to take over the rim of the vessel at the rear of the channel, and by frictional engagement support the thermometer 14 in a firm and relatively fixed position in the vessel. The sliding clamp 17, may be adjusted longitudinally upon the plate 15, to adapt it to vessels of different depths. An insulating handle 19, may be attached to the upper end of the metal plate 15 of the thermometer, if desired, for convenience.

A basket 20, having a perforated bottom and a perforated side wall, is intended to be used in connection with the vessel, and the basket 20 will be provided with a handle 21, by means of which the basket may be inserted in the vessel, and withdrawn therefrom. The bottom of the basket 20 is provided with a plurality of embossments 22, which serve to support the basket above the bottom of the utensil, to permit a free circulation of the liquid fat.

The thermometer 14 lies entirely within the channel and flush with or outside of the inner surface of the wall of the vessel, and in such position that the basket may be inserted in and removed from the vessel without interference.

The exposed scale of the thermometer is clearly visible, and the temperature of the hot cooking oil or liquid fat in the vessel may be ascertained at a glance, and the heat easily regulated in proportion to the requirements of the particular food material which it is desired to subject to the cooking operation.

The constructions shown and described illustrate how the invention may be embodied, but it is to be understood that the constructions have been selected merely for the sake of example and that various changes in the size, shape and arrangement of the parts may be made without departing from the spirit of the invention or the scope of the subjoined claims.

The invention claimed is:

1. A cooking utensil comprising a vessel having its side wall formed with an inwardly opening channel communicating substantially throughout its length with the interior of the vessel and adapted to receive and contain entirely within its confines a thermometer and expose the same to the temperature of the contents of the vessel, said channel being open at its upper end to provide for ready reading of the thermometer while it is in position in said channel.

2. A cooking utensil comprising a vessel provided with a bottom and a side wall and having its side wall flanged outwardly and then upwardly at its upper end to provide an expansion space, the side wall having a vertical channel extending through the outwardly disposed flange and terminating in a shelf adjacent the bottom of the receptacle, said channel opening inwardly and communicating with the interior of the vessel whereby it is adapted to receive a thermometer and expose the same to the temperature of the contents of the vessel, the portion of the upwardly extending flange above said channel being adapted to engage the thermometer and to aid in holding it in position.

3. A cooking utensil comprising a vessel provided with a bottom and a side wall, said side wall having a portion provided with a channel located outside of the confines of the side wall and opening inwardly to communicate freely with the interior of the vessel and also open at its top so as to be adapted to receive and contain entirely within its confines a thermometer.

4. In a cooking utensil having a removable inner basket, an outer vessel provided with a bottom and a side wall, said side wall having a portion provided with a channel located outward of the confines of the side wall and opening inwardly to communicate freely with the interior of the vessel and also open at its top so as to be adapted to receive and contain entirely within its confines a thermometer, whereby said basket may be positioned within and removed from a vessel without interfering with the thermometer placed in said channel.

5. A cooking utensil comprising a vessel having its side wall formed with an inwardly opening channel communicating with the interior of the vessel and adapted to receive and contain entirely within its confines a thermometer.

6. A cooking utensil comprising a vessel made up of a bottom and a side wall, said side wall having a portion cut away and a channel forming member positioned on the outside of the vessel and secured to the margins of the cut away portions to define a channel opening inwardly and communicating with the interior of the vessel, said channel adapted to receive and contain entirely within its confines a thermometer.

7. A cooking utensil comprising a vessel made up of a bottom and a side wall, the upper portion of the side wall being flanged outwardly and then upwardly, said side wall and said outwardly extending flange having a portion cut away and a channel forming member disposed outwardly of the vessel and having portions overlapping the margins of the cut-outs of the side wall and horizontal flange and secured thereto to provide a channel opening to and communicating with the interior of the vessel and also open at its upper end.

8. A cooking utensil comprising an outer vessel made up of a bottom and a side wall, said side wall having means coacting therewith to form a well disposed outside of but communicating with the interior of the outer vessel and open at its top whereby it is adapted to receive, support and contain entirely within its confines a thermometer and expose the latter to the temperature of the interior of the outer vessel.

9. In a cooking utensil having a removable inner basket, an outer vessel made up of a bottom and a side wall, said side wall having means coacting therewith to form a well disposed outside of but communicating with the interior of the outer vessel and open at its top whereby it is adapted to receive and support a thermometer and expose the latter to the temperature of the interior of the outer vessel, without interfering with the removability of said inner basket.

GUSTAV PAUL BARTELS.